(12) United States Patent
Pierce et al.

(10) Patent No.: US 6,865,558 B1
(45) Date of Patent: Mar. 8, 2005

(54) POSTAGE METERING SYSTEM HAVING THIRD PARTY PAYMENT CAPABILITY

(75) Inventors: Perry A. Pierce, Darien, CT (US); Allen L. Kramer, Middletown, CT (US)

(73) Assignee: Pitney Bowes Inc., Stamford, CT (US)

( * ) Notice: Subject to any disclaimer, the term of this patent is extended or adjusted under 35 U.S.C. 154(b) by 294 days.

(21) Appl. No.: 09/679,802

(22) Filed: Oct. 5, 2000

(51) Int. Cl.[7] .......................... G06F 17/60; H04K 1/00
(52) U.S. Cl. ............................ 705/60; 705/50; 705/64; 705/401; 705/408; 705/410; 713/176
(58) Field of Search ........................... 705/60–62, 401, 705/408, 410, 50, 64, 70, 77, 400, 402; 713/176–179; 382/232, 250

(56) References Cited

U.S. PATENT DOCUMENTS

| | | | |
|---|---|---|---|
| 4,713,761 A | | 12/1987 | Sharpe et al. ............... 364/406 |
| 5,621,640 A | * | 4/1997 | Burke ........................ 705/14 |
| 5,703,783 A | | 12/1997 | Allen et al. ............ 364/478.01 |
| 5,717,597 A | | 2/1998 | Kara ..................... 364/464.18 |
| 5,819,239 A | * | 10/1998 | Berson et al. ............... 705/403 |
| 6,085,181 A | | 7/2000 | Gravell et al. ............... 705/408 |
| 6,097,834 A | * | 8/2000 | Krouse et al. ............... 382/137 |
| 6,112,191 A | * | 8/2000 | Burke ........................ 705/41 |
| 6,119,106 A | * | 9/2000 | Mersky et al. ............... 705/40 |
| 6,138,107 A | * | 10/2000 | Elgamal ..................... 705/39 |
| 6,227,445 B1 | | 5/2001 | Brookner .................... 235/379 |
| 6,233,565 B1 | * | 5/2001 | Lewis et al. ................. 705/35 |
| 6,260,029 B1 | * | 7/2001 | Critelli ...................... 705/408 |
| 6,289,323 B1 | * | 9/2001 | Gordon et al. ............... 705/40 |
| 6,385,731 B2 | * | 5/2002 | Ananda ...................... 713/202 |
| 6,427,021 B1 | * | 7/2002 | Fischer et al. ............... 382/101 |
| 6,473,740 B2 | * | 10/2002 | Cockrill et al. .............. 705/27 |

FOREIGN PATENT DOCUMENTS

| | | | |
|---|---|---|---|
| WO | WO 00/79455 A1 | 12/2000 | ........... G06F/17/60 |

OTHER PUBLICATIONS

Bits O' Pieces News from Around the Industry, *Mailing Systems Technology Managing Strategies for Business Communications*, Nov.–Dec. 2000.

Soaring To New Heights, *Mailing Systems Technology*, Mar.–Apr. 2001.

"Making EDI Work in a Quick Response World"; Transporation & Distribution; Sep. 1992, vol. 33, No. 9, pp. 96, 98, see entire article attached.

Su, Jiawen and Daniel Manchala, "Building Trust for Distributed Commerce Transactions", IEEE, 1997, 0–8186–7813–5/97.

* cited by examiner

*Primary Examiner*—James P. Trammell
*Assistant Examiner*—Kambiz Abdi
(74) *Attorney, Agent, or Firm*—Angelo N. Chaclas; Charles R. Malandra; George M. Macdonald

(57) ABSTRACT

A payment processing system includes a data center, a postage metering system and a control system in operative communication with the data center and the postage metering system. The postage metering system is located remotely from the data center. The control system obtains payment data via the postage metering system where the payment data includes a payee and a payment amount. Further, the control system dispatches payment from the data center to the payee for the payment amount.

18 Claims, 5 Drawing Sheets

POSTAGE METERING SYSTEM HAVING THIRD PARTY PAYMENT CAPABILITY

CROSS REFERENCE TO RELATED APPLICATIONS

This application is related to the following co-pending application filed concurrently herewith and commonly assigned to the assignee of this application: U.S. patent application Ser. No. 09/679,801, entitled POSTAGE METERING SYSTEM HAVING FUNDS RECONCILIATION FOR THIRD PARTY PAYMENTS. This application is also related to the following co-pending applications, all of which were filed on Dec. 30, 1998 and are commonly assigned to the assignee of this application: U.S. patent application Ser. No. 09/224,256, entitled POSTAGE PRINTING SYSTEM HAVING SUBSIDIZED PRINTING OF THIRD PARTY MESSAGES; U.S. patent application Ser. No. 09/223,504, entitled POSTAGE PRINTING SYSTEM HAVING VARIABLE SUBSIDIES FOR PRINTING OF THIRD PARTY MESSAGES and U.S. patent application Ser. No. 09/223,643, entitled PRODUCTION MAIL SYSTEM HAVING SUBSIDIES FOR PRINTING OF THIRD PARTY MESSAGES ON MAILPIECES, all of which are specifically incorporated herein by reference.

FIELD OF THE INVENTION

This invention relates generally to postage metering systems. More particularly, this invention is directed to a postage metering system having third party payment capability that may be selectively activated by an operator.

BACKGROUND OF THE INVENTION

Postage metering systems are well known in the art. A typical postage metering system applies evidence of postage, commonly referred to as postal indicia, to an envelope or other mailpiece and accounts for the value of the postage dispensed. As is well known, postage meters include an ascending register that stores a running total of all postage dispensed by the meter, and a descending register, that holds the remaining amount of postage credited to the meter and that is reduced by the amount of postage dispensed during a transaction. The postage meter generally also includes a control sum register that provides a check upon the descending and ascending registers. The control sum register has a running account of the total funds being added into the meter. The control sum register must always correspond with the summed readings of the ascending and descending registers. The control sum register is the total amount of postage ever put into the machine and it is alterable only when adding funds to the meter. In this manner, by inspecting the various registers and securing them from tampering, the dispensing of postal funds may be accurately recorded, tracked and accounted for.

More recently, a postage metering system has been developed where the accounting structure described above is no longer resident with the user. Sometimes referred to as a "virtual postage meter", these types of postage printing systems dispense postage electronically over suitable communication channels (LAN, WAN, telephone lines, Internet, etc.). The user maintains an account with a remotely located data center (maintained by an authorized postage meter manufacturer) and receives postage securely using appropriate electronic data interchange techniques. At a later time, the user is invoiced for the amount of postage dispensed and any other fees associated with maintaining the account with the data center. Oftentimes, a secret code or token is derived from information particular to the mailpiece (the indicated postage amount, date, recipient address information, etc.) and is incorporated or embedded into the postal indicia for later use by a postal authority in verifying the integrity of the postal indicia. Examples of such systems are described in U.S. Pat. No. 4,725,718 and U.S. Pat. No. 5,454,038.

It is also known to print selected messages (sometimes referred to as ad slogans although such messages are not restricted to advertisements) along with the postal indicia. Generally, the message bears no relation to the postal indicia. In traditional postage meters employing either rotary drum or flat bed printing technology, the message was printed along with the postal indicia by including an additional printing die representative of the message. Examples of die based systems for printing messages are disclosed in U.S. Pat. No. 5,168,804 and U.S. Pat. No. 5,024,153. More recently, the postage meter industry has begun to incorporate digital (dot matrix) printing technology which obviates the need for dies as the digital printer may be supplied with suitable drive signals to effect printing of the message. Examples of digital printing technology based systems for printing messages are disclosed in U.S. Pat. No. 4,831,554 and U.S. Pat. No. 5,509,109.

Although postage metering systems have served well in this capacity, they have tended to be dedicated devices. That is, they have not included functionality that extends beyond postage metering. However, market forces tend to favor those types of products and services that are more general purpose in nature and may provide a range of capabilities. In this way, operational efficiency may be improved by leveraging the investment in the products over a greater range of activities.

Therefore, there is a need for an improved postage metering system that allows the operator to perform additional tasks other than dispensing postage.

SUMMARY OF THE INVENTION

The present invention provides a system and methods for improving the functionality of postage metering systems by adding third party payment capability to the postage metering system. Generally, this is accomplished by allowing a user to specify payment data via the postage metering system and having a data center dispatch payments accordingly.

In accordance with the present invention, there is provided a payment processing system that includes a data center, a postage metering system and a control system in operative communication with the data center and the postage metering system. The postage metering system is located remotely from the data center. The control system obtains payment data via the postage metering system where the payment data includes a payee and a payment amount. Further, the control system dispatches payment from the data center to the payee for the payment amount.

In accordance with the present invention, a method of operating a payment processing system and a method of operating a data center are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
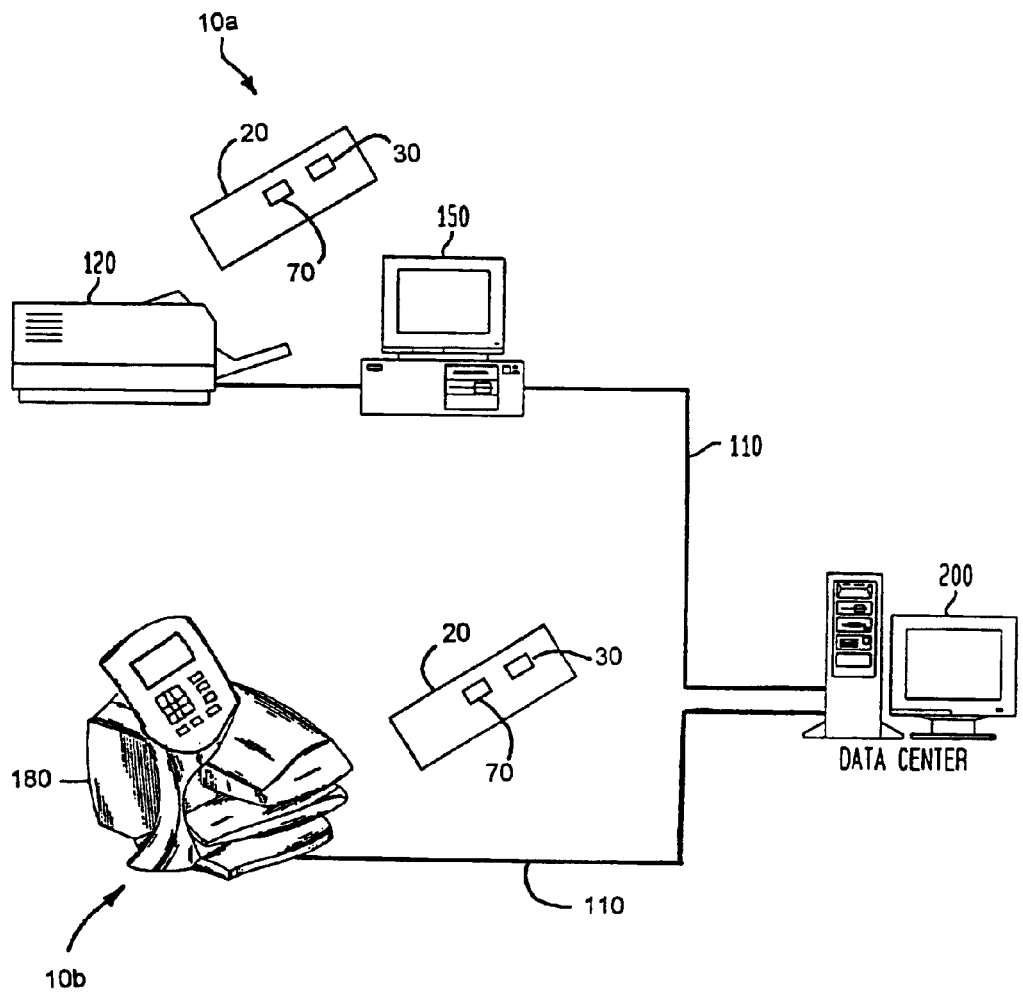
FIG. 1 is a simplified representation of a postage metering environment including a data center and two different types of postage metering systems a in electronic communication with the data center in which the present invention may be incorporated.

Referring to FIG. 1, examples of postage metering systems 10a and 10b for printing postage on a mailpiece 20 are shown. A postage metering system 10a is indicative of one example of a virtual postage metering environment (typically referred to in the industry as an open system), such as the ClickStamp® Online postage metering system available from Pitney Bowes, in which the present invention may be incorporated. Generally, the postage metering system 10a includes personal computer 150 (personal computer, workstation, laptop computer or the like) in operative communication with a printer (laser, ink jet, or the like) 120. The postage metering system 10a is further in communication over any suitable communication network 110 (LAN, WAN, telephone line, internet, etc.) with a data center 200. On the other hand, a postage metering system 10b is indicative of another type of postage metering environment (typically referred to in the industry as a closed system) where the postage meter 180, such as the DM300™ postage metering system available from Pitney Bowes, is a device that is capable of operation without connection to the data center 200. Generally, together the postage metering systems 10a and 10b and the data center constitute a payment processing system as described in greater detail below. Since the postage metering systems 10a and 10b are well known in the art, there descriptions will be limited to that which is necessary for an understanding of the present invention.

Generally, it is anticipated that the postage metering system 10a or 10b are remote terminal type of devices that would be located in business offices and/or in private residences and used for obtaining and printing postage. The data center 200 is maintained and operated by an authorized postage meter manufacturer or some other authorized agency. Those skilled in the art will recognize that not every postage metering system 10a and 10b needs to utilize the same network 110 in contacting the data center 200.

Figure 2:
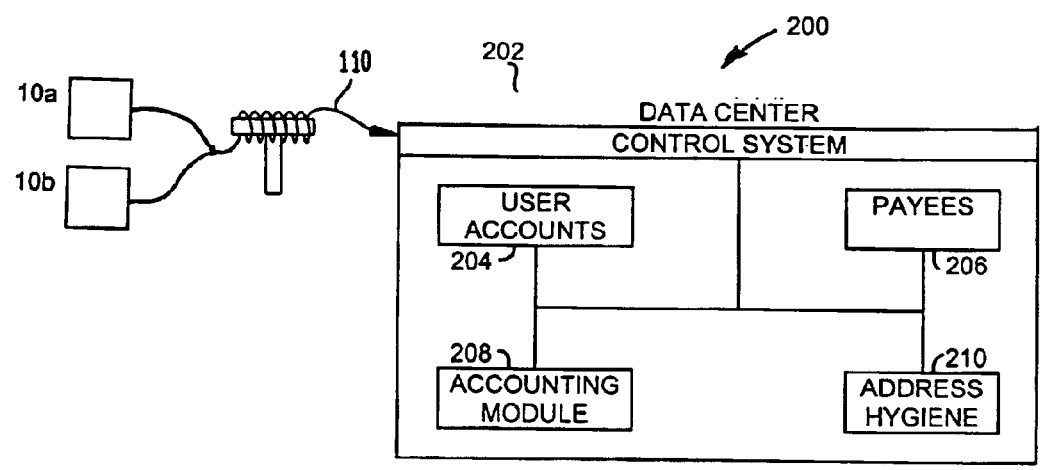
FIG. 2 is a more detailed diagrammatic representation of the data center 200 in accordance with the present invention.

Referring to FIG. 2 in view of FIG. 1, a more detailed diagrammatic representation of the data center 200 is shown. As discussed above, the data center 200 is in communication over any suitable communication network 110, such as: telephone lines, public and private network systems (Internet) or the like; with the postage metering systems 10a and 10b. The data center 200 may be based on any conventional computer based platform (PC, server, workstation, mainframe or the like) and includes a control system 202, a user account database 204, a payee database 206, a postage accounting module 208 and an optional address hygiene database 210, all of which are in operative communication with each other using conventional means. The user database 204 contains information concerning individual user accounts, such as: user name and/or account ID, user address, account balance, preferred postage account recharge options (direct credit card authorization, electronic funds transfer, etc.), and the like, that have been established with the postage meter manufacturer. As is well known, postage metering systems 10a and 10b in the United States are debit based accounting devices. In other words, postage is drawn from funds that the user has already placed into an account.

The payee database 206 contains information concerning individual payees, such as: payee name, payee bank routing ID, payee bank account ID, and the like, that has been provided to the postage meter manufacturer by the users or the individual payees. The accounting module 208 accurately records, tracks and accounts for the postal funds that are in each of the user accounts and also handles the account reconciliation that occurs when postage is dispense or payments to the payees are authorized. The address hygiene database 210 may employ any suitable database for use in cleansing recipient addresses (described in greater detail below) to ensure that they are complete and correct, such as the Address Matching System (AMS) available from the United States Postal Service, Cross Check™ software system available from Pitney Bowes Inc. of Stamford, Conn. or any other commercially available system for cleansing addresses.

Figure 3:
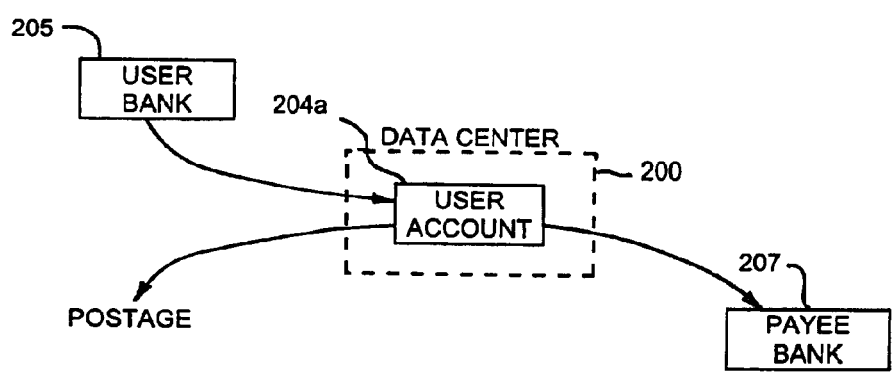
FIG. 3 is a flow diagram representing a flow of funds from a user to a payee in accordance with the present invention.

Referring to FIG. 3 in view of FIGS. 1 and 2, a diagram representing the flow of funds from a particular user account 204a to a particular payee via a particular payee bank 207 is shown. Generally, as described above, the user arranges to establish the particular user account 204a with the data center 200 with an infusion of funds from a user bank 205 (credit card, checking account, savings account, or the like). From this account, the data center 200 dispenses postage and makes payments to the particular payee via the particular payee bank 207 at the user's direction.

Figure 4A:
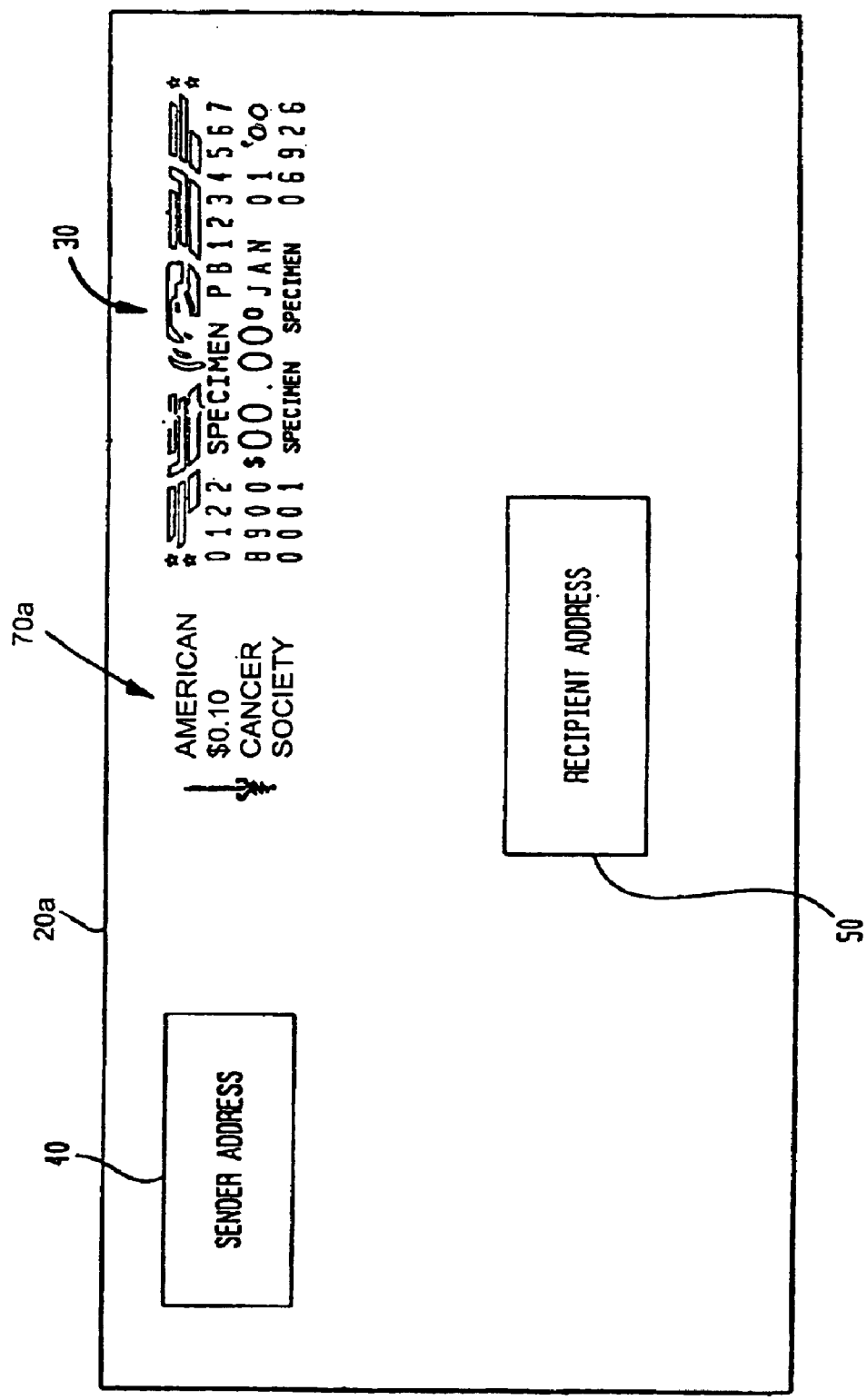
FIG. 4a is a front view of a first mailpiece that has been processed by the postage metering system and bears an indication of a first third party payment in accordance with the present invention.

Referring to FIG. 4a in view of FIGS. 1, 2 and 3, a first mailpiece (standard envelope, post card, business return envelope, label, etc.) 20a that has been processed by a postage metering system 10a or 10b is shown. As is known in the art, the first mail piece 20a includes a postal indicia 30, a sender address 40 and a recipient address 50 printed thereon. Additionally, the first mail piece 20a includes an indication 70a of a third party payment. In this example, the indication 70a represents a donation of $0.10 that has been made by the user to the American Cancer Society.

Figure 4B:
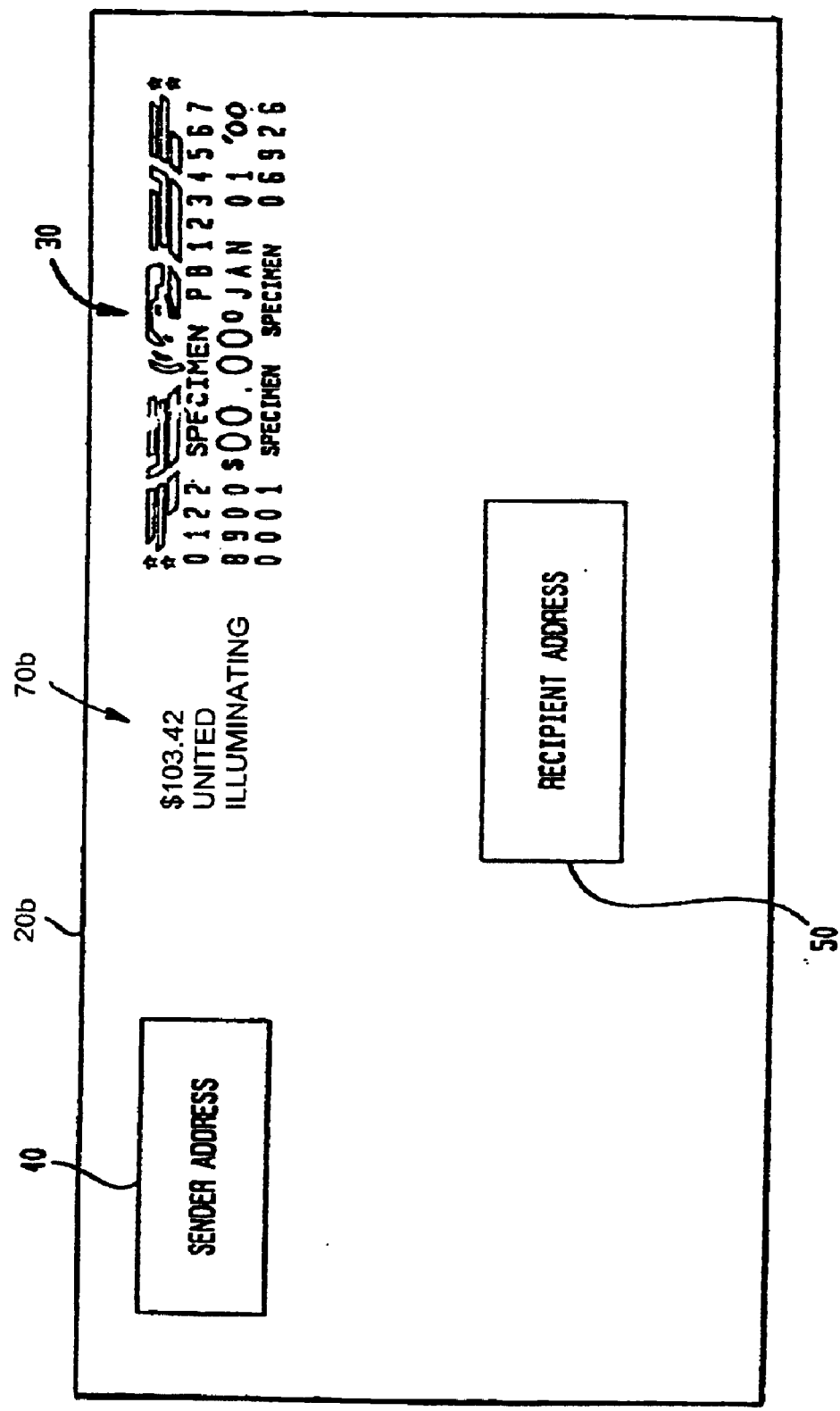
FIG. 4b is a front view of a second mailpiece that has been processed by the postage metering system and bears an indication of a second third party payment in accordance with the present invention.

Referring to FIG. 4b in view of FIGS. 1, 2 and 3, a second mailpiece 20b that has been processed by a postage metering system 10a or 10b is shown. As discussed above, the second mail piece 20b includes a postal indicia 30, a sender address 40 and a recipient address 50 printed thereon. Additionally, the first mail piece 20a includes an indication 70b of a third party payment. In this example, the indication 70b represents payment of the user's electricity bill. Preferably, the recipient address 50 of the second mailpiece 20b is an address designated by the electric utility. In this manner, the electric utility will receive notification that the user has made arrangements for payment.

With the structure of the present invention described as above, the operational characteristics will now be described with respect to a typical transaction initiated by a user. For the sake of clarity, it is assumed that the user is operating an open metering type of postage metering system 10a.

Figure 5:
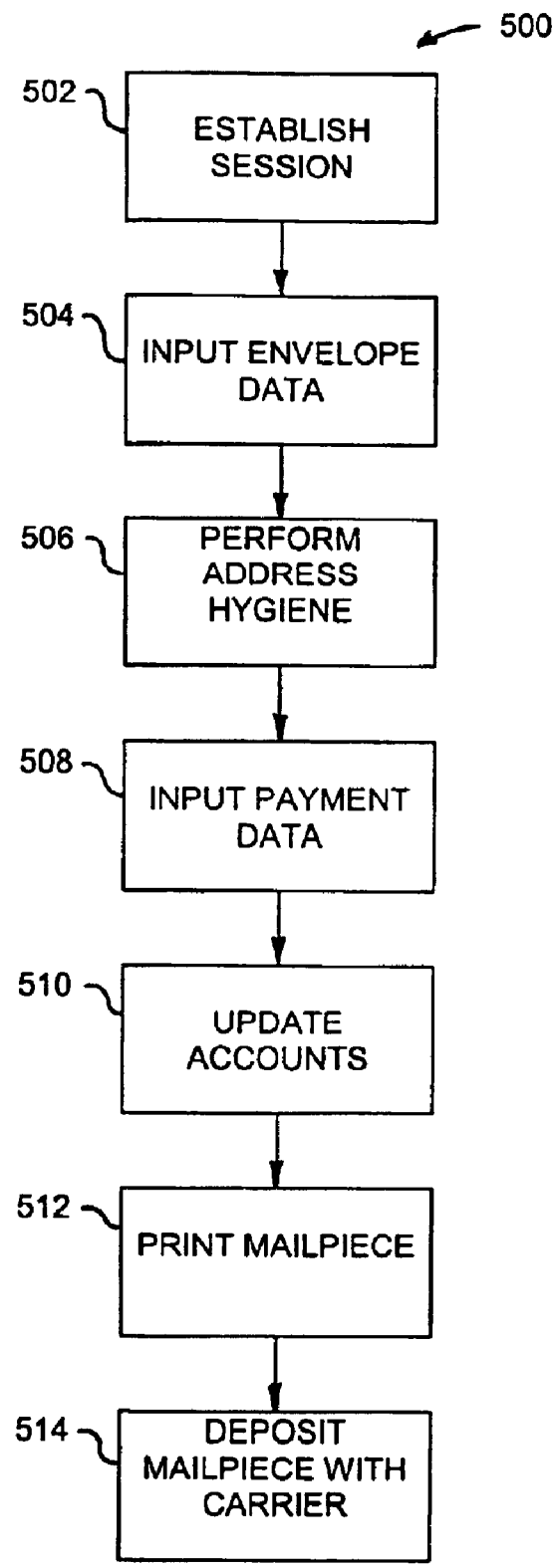
FIG. 5 is a flow chart showing the operation of the postage metering system in accordance with the present invention.

Additionally, it is assumed that the user maintains a valid account with the data center 200 and desires to arrange for a third party payment. Referring primarily to FIG. 5 while referencing the structure of FIGS. 1, 2, 3, 4a and 4b, a flow chart of a transaction routine 500 in accordance with the present invention is shown.

At 502, the transaction routine 500 commences when the postage metering system 10a contacts the data center 200 to establish a session for the purpose of printing postage. As is known in the art, the postage metering system 10a and the data center 200 recognize each other as authentic using any conventional mutual authentication technique. This generally involves the user of the remote computer 150 transmitting a valid account number or other identifying information and a corresponding password. In this manner, postage is not inadvertently supplied to one party while a second party is invoiced for the postage. Once the session has been successfully established, the details of the transaction may continue.

At 504, the data center 200 obtains relevant data necessary to produce the postal indicia 30 for the mailpiece 20. This typically involves the user transmitting a desired postage amount and the recipient address 50 to the data center 200. Preferably, this is accomplished by having the user enter appropriate data fields (postage amount, 3 or 4 line address block, etc.) in a menu screen prior to uploading to the data center 200. Alternatively, the address information may be retrieved from a word processing document such as a letter or selected off of a previously stored address list. Next, at 506, the data center 200 performs address hygiene. Although current United States Postal Service regulations require that address hygiene be performed to facilitate the delivery of the mailpiece 20, this element does not constitute part of the present invention. The recipient address 50 received from the user is compared against the address hygiene database 210. At this time, any misspelled words are corrected and any missing information (ZIP code or ZIP+4) is filled in from the address hygiene database 210 to yield a hygiened or corrected recipient address 50. If the data center 200 cannot verify the integrity of the recipient address 50 received from the user, then the user may be instructed to check the recipient address 50 and resubmit it.

Next, at 508, the data center 200 obtains relevant payment data necessary to establish a third party payment associated with the mailpiece 20. This typically involves the user selecting a third party payee 206, a desired payment and optionally a date for dispatch of the desired payment to the third party payee 206. Preferably, the data center 200 utilizes a data acquisition screen with pull down menus to facilitate acquisition of this data. Next, at 510, the accounting module 208 of the data center 200 reconciles the transaction by debiting the user account 204 for the postage and the desired payment and coordinating payment to the payee 206. Those skilled in the art will recognize that if the users account does not contain sufficient funds to cover this transaction, then the user will be prompted to recharge the postage account or terminate the transaction. Preferably, the payment is dispatched on behalf of the user via electronic funds transfer on the date specified by the user to the payee's bank using the payee bank's routing ID. Next, at 512, the mailpiece 20 is printed with the postal indicia 30 and the third party payment indication 70. Preferably, the third party payment indication 70 includes an amount, a payee identifier and a user identifier. In this way, the payee knows who paid, how much was paid and to whom it was paid. Then, at 514, the mailpiece 20 is deposited with the carrier (postal authority) for delivery.

It should be understood that the third party payment indication 70 might serve in two different capacities. In the case of a donation, the mailpiece 20 may or may not be sent the third party. Thus, the third party payment indication 70 serves primarily as an advertisement. On the other hand, in the case of bill payment, it is intended that the mailpiece 20 be sent to the third party. In this manner, the third party payment indication 70 serves as notice to the third party that payment has been arranged and will be provided by the data center 200. In other words, the third party payment indication 70 may be viewed as a receipt that indicates that the user has taken all necessary steps to initiate payment. Thus, because the data center 200 is a trusted entity, this is a better indication for the third party that the payment is forthcoming than a mere assurance from the user that the "check is in the mail." Those skilled in the art will recognize that this same benefit is available to payees that are the beneficiaries of a donation so long as the mailpiece 20 is sent to the payee.

Base on the above description and the associated drawings, it should now be apparent that the present invention improves the ability of users to access increased functionality from their postage metering systems. The postage metering systems can now facilitate non-postal carrier related payments to third parties. It should also now be apparent that payees have another channel through which they may receive payments from users.

Many features of the preferred embodiment represent design choices selected to best exploit the inventive concept as implemented in a particular virtual postage meter environment, such as the one of the postage metering system 10a. However, those skilled in the art will recognize that various modifications can be made without departing from the spirit of the present invention. For example, the address hygiene database 210 may be resident at the postage metering system 10a. Thus, a portion of the functionality of the data center 200 described above would be off loaded to the postage metering system 10a. The postage metering system 10a could then periodically receive updated information concerning the address hygiene database 210 by any conventional means. Thus, those skilled in the art will recognize that there are many ways to distribute the functionality described above between the data center 200 and the postage metering system 10a.

As another example, the printing of the postal indicia 30 with the third party payment indication 70 is not a requirement. The payee may provide a postage paid Business Reply Card/Envelope (collectively "Business Return Mailpiece") to the user that is intended for just such purposes. The business return mailpiece may have been provided to the user as part of an invoice and may include user identification data and mailpiece routing data that assists the payee in processing the payment data. Alternatively, the user may decide to use stamps as the postage payment vehicle. In either case, the postage metering system 10a need only print the third party payment indication 70.

As yet another example, the concepts described above may be implemented in a closed system type of postage metering environment, such as the one of the postage metering system 10b. In this case, the postage metering system 10b is not in real time communication with the data center 200. The postage metering system 10b includes a postage funds register, as is known in the art, and is often in stand-alone operation. The postage metering system 10b contacts the data center 200 for remote inspections and to recharge the postage funds register. Thus, the data input for each transaction generally occurs at the postage metering system 10b. To facilitate this, the user may download payee data, as necessary, from the data center 200. When the user completes a transaction including a third party payment, the amount of the third party payment is debited from the postage funds register and a special record is created and stored within the postage metering system 10b directed to the details of the transaction. Then, when the postage metering system 10b next contacts the data center 200, the data center 200 uses this transaction record to initiate payment to the third party.

As yet still another example, the third party payment indication 70 may include a payment date and a digital signature, or other encryption technique, for verifying the integrity of the indication 70. Any combination of payment data, such as: the payment amount and the payment date; may be digitally signed (generated by the data center or the postage metering system) so that the payee can detect if the payment data contained within the payment indication has been tampered with. In this way, the payee has an even greater confidence in the veracity of what is printed in the third party payment indication 70 (receipt).

As still yet another example, the data center 200 may dispatch a separate confirmation message (e-mail, or the like) to the payee in response to the transaction that contains all the relevant transaction information (payment amount, payment date, etc.). Here again, the payee has an even greater confidence in the veracity of the third party payment indication 70 (receipt) and is likely to receive this confirmation message before the physical mailpiece 20 is delivered.

As still yet another example, the data center 200 may aggregate a plurality of small payments made to the same third party into a single payment on a periodic basis. In this way, the transaction costs for the data center 200 and the payees are reduced.

As still yet another example, the postage metering systems 10a and 10b may maintain a second funds account that is separate from the postage funds. In this way, the payment funds and the postage funds are not commingled. Thus, the risk that the postage funds would not be unexpectedly drawn down by payments to such a low level that the user's mailing activities would be negatively impacted, an vice versa. Also, the user may desire this type of isolated accounting practice for ease of administration.

As still yet another example, the data center 200 may aggregate payments to the same payee over a population (plurality) of the postage metering systems 10a and 10b. In this way, the payments that have been authorized by different users over a given period of time that are intended for the same payee may be gathered together and aggregated into a single payment to the payee.

Therefore, the inventive concept in its broader aspects is not limited to the specific details of the preferred embodiments described above, but is defined by the appended claims and their equivalents.

What is claimed is:

1. A payment processing system, comprising:
    a data center,
    a postage metering system located remotely from the data center, and
    a control system in operative communication with the data center and the postage metering system, the control system for:
    obtaining third party payment data via the postage metering system, the payment data including a payee and a payment amount;
    coordinating printing by the postage metering system of an indication of the third party payment on a mailpiece intended for delivery to a mailpiece recipient other than the payee; and
    dispatching payment from the data center to the payee for the payment amount in response to the receipt of payment data;
    wherein the payment data further includes a future date selected by a payor, on which the payment is authorized for dispatch.

2. The payment processing system of claim 1, wherein:
    the third party payment indication includes a digital signature of a least a portion of the payment data so that any attempts to tamper with the payment data are detectable.

3. The payment processing system of claim 2, wherein:
    the mailpiece is a business return mailpiece provided by the payee, the business return mailpiece including space to receive the indication of the third party payment.

4. The payment processing system of claim 3, wherein:
    the control system is further for:
    collecting payments from a plurality of postage metering systems that are directed to the payee before dispatching an aggregated payment to the payee.

5. The payment processing system of claim 1, wherein:
    the control system is further for:
    collecting payments from a plurality of postage metering systems that are directed to the payee before dispatching an aggregated payment to the payee.

6. The payment processing system of claim 5, wherein:
    the payment data further includes a date on which the payment is authorized for dispatch.

7. A method of operating a payment processing system, the method comprising the step(s) of
    locating a postage metering system remotely from a data center; transmitting payment data via a postage metering system to the data center, the payment data including a payee and a payment amount;
    the payment data further includes a future date selected by a savor on which the payment is authorized for dispatch;
    dispatching payment from the data center to the payee for the payment amount in response to the receipt of payment data and the occurrence of the future date; and
    further comprising the steps) of: coordinating printing by the postage metering system of an indication of the third party payment on a mailpiece intended for delivery to the payee.

8. The method of claim 7: further comprising the step(s) of:
    generating a digital signature of a least a portion of the payment data and including the digital signature with the third party payment indication so that any attempts to tamper with the payment data are detectable.

9. The method of claim 8, further comprising the step(s) of:
    providing a business return mailpiece for use as the mailpiece, the business return mailpiece including space to receive the indication of the third party payment.

10. The method of claim 9, further comprising the step(s) of:
    collecting payments from a plurality of postage metering systems that are directed to the payee before dispatching an aggregated payment to the payee.

11. The method of claim 7, further comprising the step(s) of:
    collecting payments from a plurality of postage metering systems that are directed to the payee before dispatching an aggregated payment to the payee.

12. The method of claim 11, wherein:
    the payment data further includes a date on which the payment is authorized for dispatch.

13. A method of operating a data center, the method comprising the step(s) of
    establishing a transaction session with a postage metering system remotely from the data center;

receiving payment data via the postage metering system, the payment data including a payee and a payment amount;

wherein the payment data further includes a future date selected by a payor on which the payment is authorized for dispatch;

dispatching payment to the payee for the payment amount in response to the receipt of payment data and the occurrence of the future date; and further comprising the step(s) of: coordinating printing by the postage metering system of an indication of the third party payment on a mailpiece intended for delivery to the payee.

14. The method of claim 13, further comprising the step(s) of:

generating a digital signature of a least a portion of the payment data and including the digital signature with the third party payment indication so that any attempts to tamper with the payment data are detectable.

15. The method of claim 14, further comprising the step(s) of:

collecting payments from a plurality of postage metering systems that are directed to the payee before dispatching an aggregated payment to the payee.

16. The method of claim 13, further comprising the step(s) of:

collecting payments from a plurality of postage metering systems that are directed to the payee before dispatching an aggregated payment to the payee.

17. The method of claim 16, wherein:

the payment data further includes a date on which the payment is authorized for dispatch.

18. The system of claim 1, wherein:

the indication of the third party payment is printed on a plurality of mailpieces intended for delivery to a plurality of mailpiece recipients other than the payee.

* * * * *